United States Patent
Stivi et al.

(10) Patent No.: US 12,536,153 B2
(45) Date of Patent: *Jan. 27, 2026

(54) SYSTEMS AND METHODS FOR AUTONOMOUS VALIDATION OF CROWD SOURCED AND OPEN SOURCED INFORMATION

(71) Applicant: GoWare Inc., Newport Beach, CA (US)

(72) Inventors: Alon Oliver Stivi, Irvine, CA (US); Stephen Damian Marlow, Irvine, CA (US)

(73) Assignee: GoWare Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,846

(22) Filed: Apr. 8, 2024

(65) Prior Publication Data

US 2024/0256522 A1   Aug. 1, 2024

Related U.S. Application Data

(63) Continuation-in-part of application No. 16/812,986, filed on Mar. 9, 2020, now Pat. No. 11,954,750.
(Continued)

(51) Int. Cl.
*G06F 16/23* (2019.01)
*G06F 16/9536* (2019.01)

(52) U.S. Cl.
CPC ...... *G06F 16/2365* (2019.01); *G06F 16/9536* (2019.01)

(58) Field of Classification Search
CPC .................. G06F 16/2365; G06F 16/9536
See application file for complete search history.

(56) References Cited

U.S. PATENT DOCUMENTS 9,280,610 B2 * 3/2016 Gruber .............. G06F 16/90332
9,541,407 B1    1/2017 Mohler
(Continued)

FOREIGN PATENT DOCUMENTS

EP    3340115 A1    6/2018

OTHER PUBLICATIONS

Case et al., "Determining the Accuracy of Crowdsourced Tweet Verification for Auroral Research", Citizen Science: Theory and Practice, 1(2):13, pp. 1-9 (Year: 2016).*
(Continued)

*Primary Examiner* — Jared M Bibbee
(74) *Attorney, Agent, or Firm* — Ryan Dean; Umberg Zipser LLP (57) ABSTRACT

Systems and methods are described for determining an accuracy of crowd-sourced information. One or more servers can be configured to interact with and receive information from a plurality of devices/sources about an event, which may include, for example, sensors, social media platforms, and user inputs. The system can analyze information about the source and information about the event received from a source to determine the reliability and accuracy of the received information. This information can be cross-checked with social media posts, nearby sensor data, and other inputs to verify authenticity and accuracy. If an event is verified or deemed reliable, the system can autonomously decide that an alert and/or guidance can be presented or transmitted to one or more recipients.

19 Claims, 7 Drawing Sheets

Related U.S. Application Data

(60) Provisional application No. 62/815,797, filed on Mar. 8, 2019.

(56) References Cited

U.S. PATENT DOCUMENTS

| | | | |
|---|---|---|---|
| 10,157,198 | B2 | 12/2018 | Cheng et al. |
| 10,678,798 | B2 * | 6/2020 | Lijachev ................. G06F 16/95 |
| 11,520,677 | B1 * | 12/2022 | Arazi ................... G06F 11/3065 |
| 2008/0140484 | A1 | 6/2008 | Akerman |
| 2011/0246388 | A1 | 10/2011 | Zhang |
| 2012/0100825 | A1 | 4/2012 | Sherman et al. |
| 2013/0304792 | A1 | 11/2013 | Marlow et al. |
| 2014/0201126 | A1 | 7/2014 | Zadeh et al. |
| 2015/0005010 | A1 | 1/2015 | Zhang et al. |
| 2015/0019565 | A1 | 1/2015 | Lijachev et al. |
| 2015/0317801 | A1 | 11/2015 | Bentley et al. |
| 2016/0140503 | A1 * | 5/2016 | Jemiolo ............. G06Q 10/1053 |
| | | | 705/321 |
| 2016/0171011 | A1 | 6/2016 | Drogobetski et al. |
| 2016/0328482 | A1 | 11/2016 | Shah et al. |
| 2018/0101595 | A1 | 4/2018 | Bastide et al. |
| 2019/0306174 | A1 | 10/2019 | Jolly et al. |
| 2020/0327586 | A1 * | 10/2020 | Miller ................. G06F 16/9535 |
| 2023/0222114 | A1 * | 7/2023 | Zack ................. G06Q 30/0203 |
| | | | 707/690 |

OTHER PUBLICATIONS

Heather Ford, "Verification of crowd-sourced information: is this 'crowd wisdom' or machine wisdom", pp. 1-9 (Year: 2013).*

* cited by examiner

Step 210: inputs can be received from one or more sources concerning an event

Step 220: the source information of each input can be analyzed using a processor to generate a credibility rating associated with each source Step 230: the location of the source can be compared with an event location to generate an accuracy rating for each input based on the distance of the source from the event location Step 240: information received that was captured by a a set of sensors within a predefined area of the event location Step 250: social media platforms can be queried about the event to generate a set of social media information about the event Step 260: an alert can be transmitted if the reliability rating is greater than a predetermined threshold Step 270: one or more additional inputs can be received from the same or different sources concerning the event

Figure 9

SYSTEMS AND METHODS FOR AUTONOMOUS VALIDATION OF CROWD SOURCED AND OPEN SOURCED INFORMATION

This application is a continuation-in-part application of U.S. non-provisional application having Ser. No. 16/812,986, filed on Mar. 9, 2020, which itself claims priority to U.S. provisional application having Ser. No. 62/815,797 filed on Mar. 8, 2019. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of invention is systems and methods for validating information from a plurality of sources.

BACKGROUND

The following description includes information that may be useful in understanding the present invention. It is not an admission that any of the information provided herein is prior art or relevant to the presently claimed invention, or that any publication specifically or implicitly referenced is prior art.

Information validation is at the core of all business, as well as security, defense, and emergency management. Although the most fundamental need is to assess accuracy and credibility of input and validation to ensure optimal decision-making and effective collaboration, this requirement has not been consistently satisfied across multiple use-case scenarios.

For example, in the field of emergency management, the continued expansion of smart mobile devices fueled by the adoption of 5G and IoT networks is driving the adoption of Wi-Fi 6 terrestrial bandwidth. Additionally, the satellite-based mass communication constellation (e.g., SPACE X™, STARLINK™, TELESAT™, LEOSAT™, and ONE-WEB™) will significantly increase the potential digital sources alerting and tracking.

These innovations will all contribute to an increase in both the amount and speed of sensor, machine, and human inputs, resulting in an even greater need to manage this data historically and in real-time time to better respond to emergencies and evaluating the reliability, credibility, and accuracy of information and events.

Furthermore, current practices known to Applicant neither address the accelerated pace of incidents and the direct correlations between time, location, actions, and losses, nor the effects of advances in technologies that would enhance effectiveness or efficiency.

Already stultified decision-making and emergency management systems, like the 911 EMS, have repeatedly failed and may collapse under the increasing influx of data, unless there is a more effective, efficient, and expedited way to intelligently assess input validity and accuracy.

The following is another example that illustrates the scale and impact of the problem. During the Stoneman Douglas High School shooting in Parkland, Florida in 2018, First Responders deployed in the wrong direction not realizing that the security camera footage they were relying on was on a time-lapse delay and that the shooter had already left the building. The delayed response contributed to the result of seventeen dead and another seventeen injured.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for systems and methods that can seamlessly and repeatedly evaluate the credibility of multiple sources of input with machine learning and artificial intelligence algorithms.

SUMMARY OF THE INVENTION

The inventive subject matter discussed here satisfies a critical gap as defined by the U.S. Department of Homeland Security and the Israeli Ministry of Public Security. Specifically, the inventive subject matter enables the ability to both autonomously and quickly and efficiently evaluate the credibility of sources and the reliability of the multitude of information concerning an event, and the event itself. In some embodiment, the inventive subject matter can incorporate credible, relevant, and high-fidelity information from multiple and non-traditional sources into incident command and operations, both pro-actively and in real time. The systems and methods provide for a cross source authentication and validation (X-SAV) software that cross-examines high-frequency and/or multi-source information and provides real-time, qualified and validated information, with a credibility or Accuracy Probability Rating (APR).

Contemplated systems and methods for determining an accuracy of crowd-sourced information may comprise one or more servers that are configured to interact with and receive information from a plurality of devices or sources, which may include, for example, sensors, social media platforms, and user inputs. The one or more servers are configured to receive inputs from one or more sources, and likely a plurality of sources, about various events that are occurring or have occurred. The system can organize and analyze the received data by event and across events to determine the reliability and accuracy of the received information.

The systems and methods preferably utilize both qualitative and quantitative data analysis methodologies to confirm (and reconfirm) the credibility of the input source and the overall reliability rating. The algorithms used will consider the following factors:

(1) Integrity—who is the source of input?
(2) Relevancy—when did the source provide input?
(3) Proximity—how close is the source to the reported activity?
(4) Accessibility—what is the source doing at the site, at the time of input?
(5) Reliability—how accurate was the source of input previously?
(6) Quantity—how many sources are providing the same input?
(7) Repeatability—how many times is the same input being provided?
(8) Variety—how many types of sources are providing input on the same incident?
(9) Incredibility—how many sources are providing false input, about the same occurrence, at that specific time?

(10) Sensitivity—does input match the source's expertise and/or mechanical capability?

(11) Relativity—how does the input provided compare to other onsite input?

(12) Feasibility—how likely is it that the input could come from the specific location?

(13) Deniability—will the source of input be affected (positively or negatively) by the input?

Upon receiving information, the system is preferably configured to scrutinize both the source information and the event information to determine the credibility of the source and the accuracy of the information.

By comparing the received information with information from other sources, such as one or more sensors within the area of the event, the server can validate the information and assign a reliability rating to the event. Based on this APR, the system can autonomously make intelligent inferences and take certain actions such as transmitting an alert or providing relevant guidance.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Contemplated systems and methods apply a combination of rule-based logic, probabilistic modelling, meaning validation logic, behavioral recognition, facial recognition, audio recognition, machine learning, and artificial intelligence techniques and algorithms to distinguish patterns of reliability and improve anomaly detection and correction of erroneous inputs (e.g. qualitative and quantitative discrepancies) in order to enable higher fidelity of information about an event from a disparate collection of sources.

Figure 2:
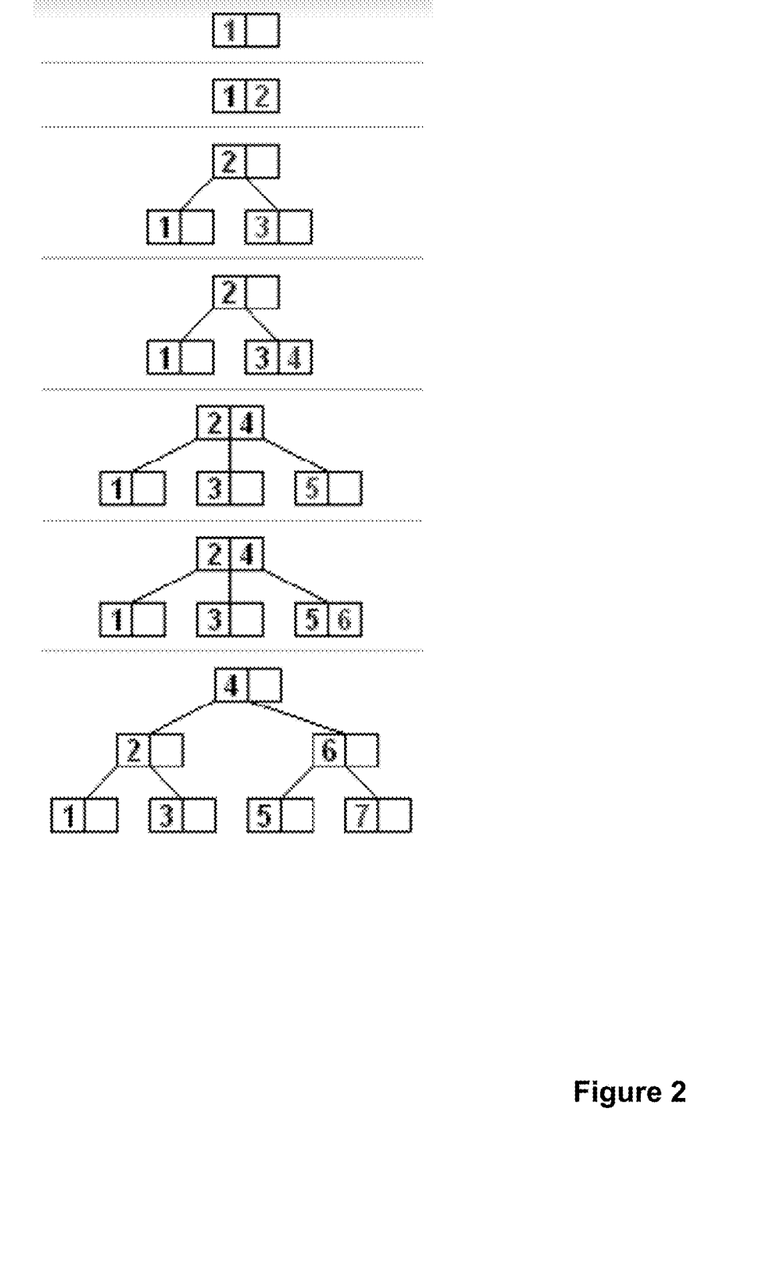
FIG. 2 is a schematic diagram of deductive reasoning that can be used by the systems and methods.

Exemplary deductive reasoning used for validating received information and determining false positives is illustrated in FIG. 2. Such deductive reasoning can be used in the various validation processes and steps described below.

Figure 1:
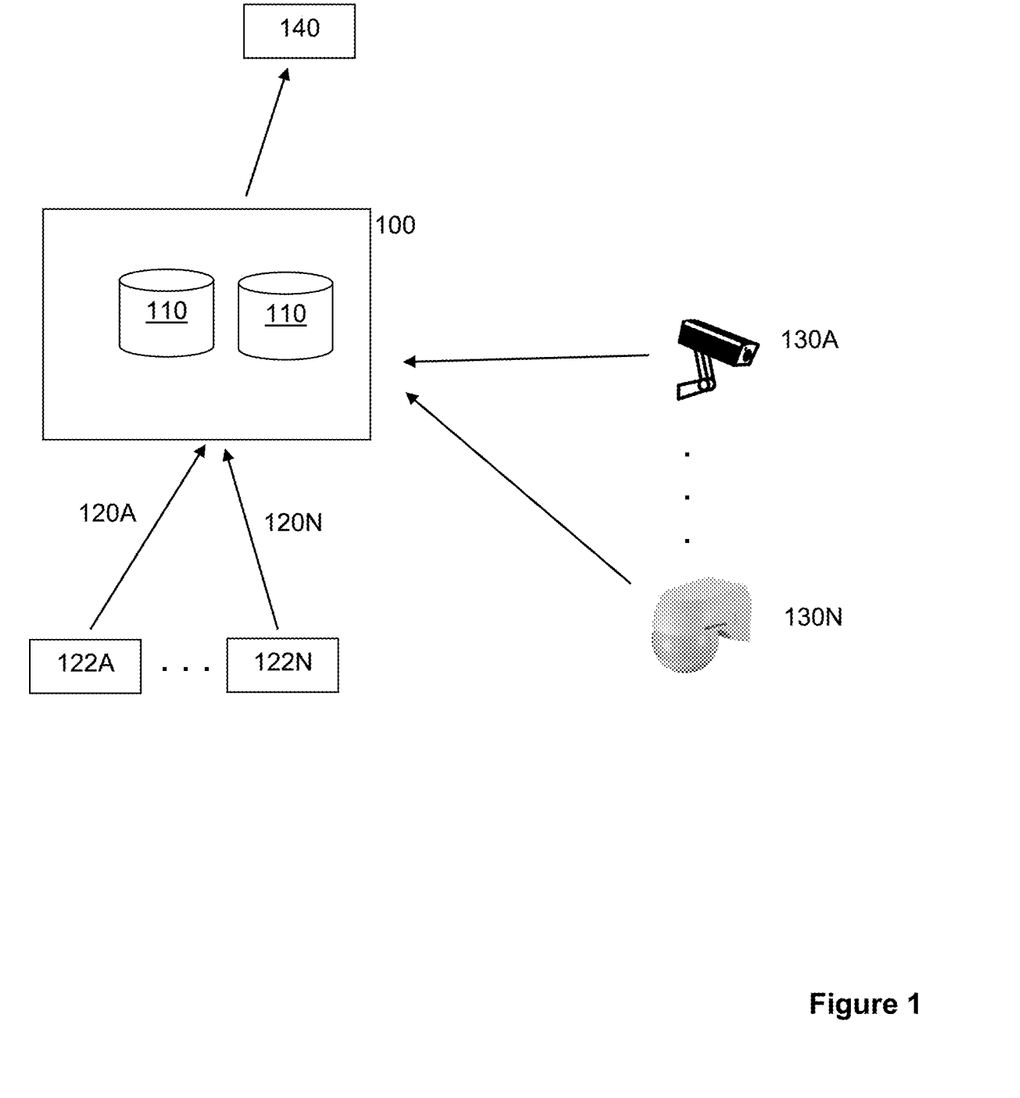
FIG. 1 is a diagram of one embodiment of a system for determining an accuracy of crowd-sourced information.

In one embodiment shown in FIG. 1, system 100 comprises one or more servers 110 configured to receive inputs 120A-120N from one or more sources 122A-122N concerning an event. Preferably, the servers 110 can receive information (inputs) about a plurality of events from a number of sources, and properly collate, analyze and rate the received information.

Contemplated inputs include, for example, sensor data, social media posts, and user submissions. For example, sensor data could include video, images, and/or audio captured by a camera or other source, motion detection, and so forth. Social media posts would typically be publicly accessible posts by one or more users on various social media platforms that can be searched for keywords and/or based on time/location. User submissions could be directed submission from one or more users through a web interface, software application, telephone call, and so forth.

Contemplated sources can include, for example, functionally responsible organizations, crowdsourcing, social media platforms, security protocols, geo-temporal tracking, archived data, industrial and environmental sensors, and audio and video capture systems.

Preferably, each of the received inputs 120A-120N comprises source and event information. The source information is information about the source, and preferably comprises at least an identifier and a location of the source. For example, where the source is a sensor, the information may include, for example, a location of the sensor, a type of sensor, and an identifier of the sensor (sensor ID). Where the source is a user, the information may include, for example, identifying information about the user (e.g., name, account username, user ID, if any), device ID such as a MAC address of a smart phone, and so forth. Where the source is a social media platform or other internet accessible content, the information may include, for example, username who posted the information, level of connectedness of the user (e.g., number of connections and/or number of posts), and platform information.

The event information can include, for example, the event location, a time that the event occurred, and input identification markers.

The one or more servers 110 are preferably configured to analyze the source information of each input of the one or more sources and assign a credibility rating to each of the sources.

In some embodiments, the one or more servers 110 can be configured to compare an identifier of each source with known identifiers stored on the server or elsewhere. For example, upon receiving the source information, the one or more servers 110 can analyze the information to determine if each of the inputs 120A-120N is from a valid method, such as a registered sensor, a system sub-routine, a registered user, or a known user. Such information can be gleaned from a unique identifier associated with the source, which may be, for example, a sensor ID, a mobile device ID, an IP Address, a MAC address, and so forth.

A credibility rating can be assigned to or associated with each of the sources 122A-122N based at least in part on whether the identifier was previously stored on one or more servers 110. Generally, registered sources are more credible and will be assigned a higher credibility rating than non-registered sources. However, a source may be known to the server even if not registered, such as by previously providing one or more inputs.

The system 100 can be further configured to analyze a profile of the user or information about a sensor or other device via the one or more servers 110 or otherwise. In this manner, the system 100 can consider a role and experience of the user, or a type of device, which may raise or lower credibility rating. For example, an off-duty law enforcement officer may be afforded a higher credibility than a civilian due to the role and experience.

Each of the known identifiers is also associated with a set of prior inputs (zero or more inputs) to the server. Where a source has previously provided inputs to the server, the system 100 can consider the accuracy of the prior inputs when determining a credibility rating of a known source. The prior inputs could raise or lower the credibility rating depending on the reliability and accuracy of the prior inputs.

Figure 6:
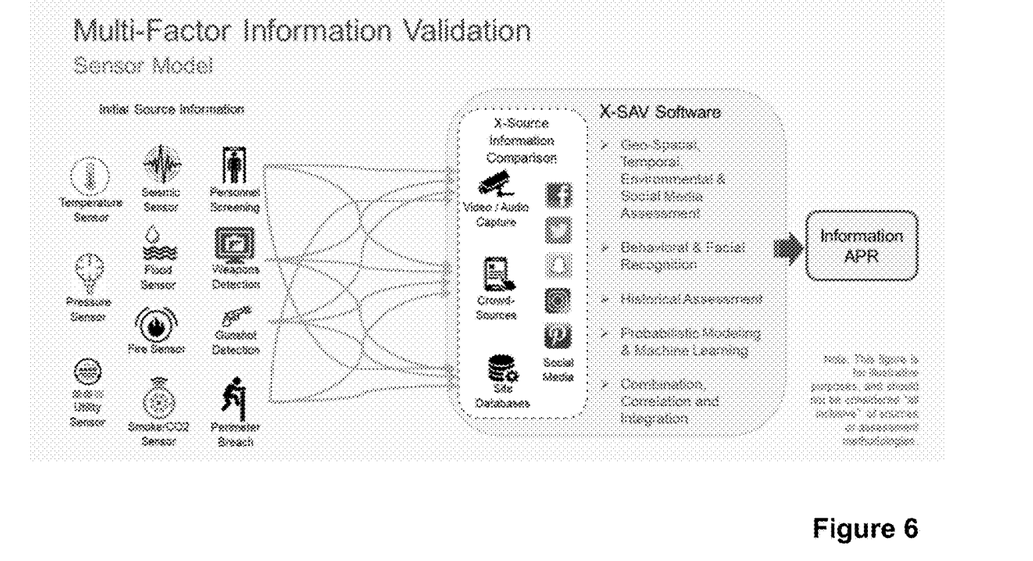
FIG. 6 is an exemplary flowchart showing sensor alert validation.
Figure 7:
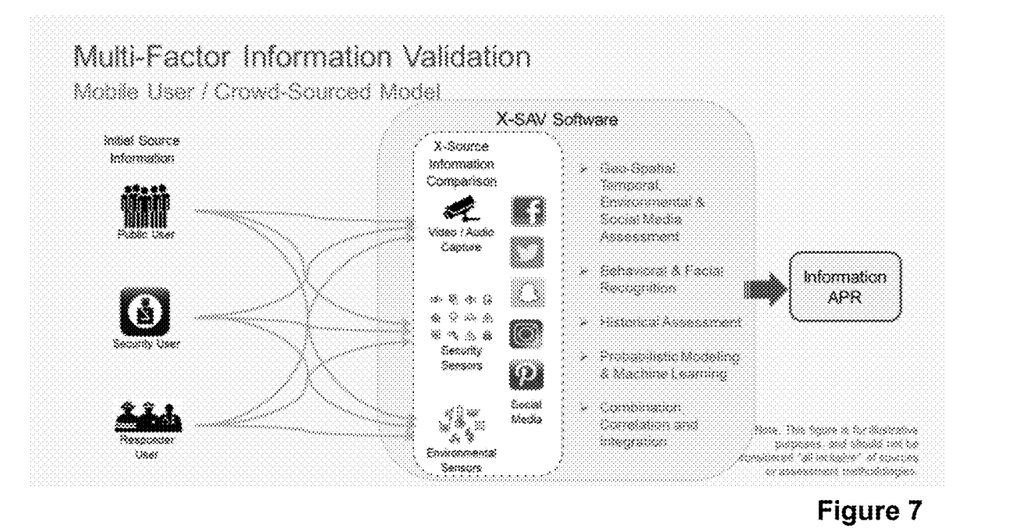
FIG. 7 is an exemplary flowchart showing crowdsourced alert validation.
Figure 8:
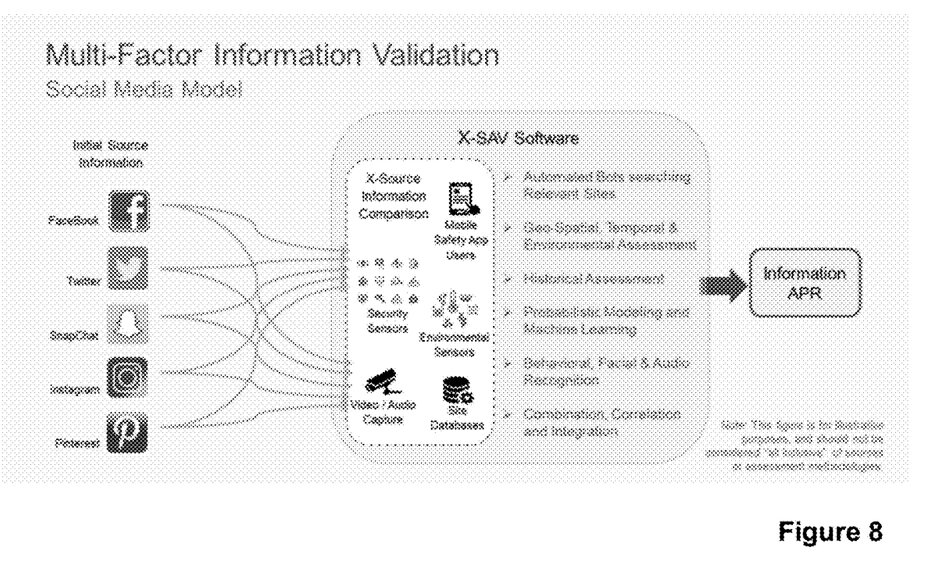
FIG. 8 is an exemplary flowchart showing social media alert validation.

For unknown sources, system 100 is preferably configured to isolate the input. However, the system 100 will continue the process to a validity of the event from the new source. The system 100 will associate a lower credibility rating to the new source until it is determined whether the source is simply new with a valid input or instead a malicious or deceptive input. This can be assisted by comparing the information about the event with other sources and cross-compare event information from the source with device information and other information to help determine if there are discrepancies that may indicate a malicious or deceptive input. Examples of this are provided below and shown in FIGS. 6-8.

When associating a credibility rating to a source, the system 100 preferably utilizes various algorithms including those that consider all user characteristics and information known to the system to determine the credibility rating. Because past credibility ratings are stored including the raw data for determining a rating, the system can utilize machine learning to improve its processes, especially where the assigned credibility rating turns out to be inaccurate.

The one or more servers 110 can also be configured to compare the location of each source 122A-122N with an event location to validate the location of the event. Thus, for example, where a user provides the input, the one or more servers 110 may verify the user's smart phone or other device to see if the reported device location is at or sufficiently nearby the event location. An event reported at the user's location is likely more accurate than one reported from remote location. The one or more servers 110 can assign an accuracy rating to each input based on the distance of the source from the event location.

To help determine accuracy of the information received about the event from the inputs, the system 100 via the one or more servers 110 can directly query and/or indirectly receive information from a set of sensors 130A-130N, which are within a predefined range of the event location. Such sensors may include surveillance cameras, motion sensors, weather sensors, and so forth that can gather information about an area. It is contemplated that the predefined range may vary depending on the type of sensor and its location, and the category of event. For example, a surveillance camera may not be useful unless it is within a certain range and directed at where the event is purportedly located. However, for a fluid event that may be changing in location over time, different ranges may be used.

It is further contemplated that the system 100 could additionally or alternatively analyze social media postings or other publicly available information to help corroborate the location and determine a precise address/location of the event. Available postings can be interrogated for reliability, geo-temporal relevancy, historical accuracy and role pertinence. The system 100 can then validate relevancy of the threads, considering their contextual basis, and determine if the information is pre-event or current event.

The system 100 can be further configured to analyze any audio, video, and images in the event information of each input 120A-120N. By interrogating relevant sensors near the event location and publicly accessible social media platforms posts searching for "chatter" of the event, the system through server can identify the event location and provide an address probability of its location. The address probability information can be stored and used for machine learning for analysis of future inputs. Based on this, the one or more servers 110 can identify if the location provided in the input was accurate, a mistake, or purposely misleading.

Figure 3:
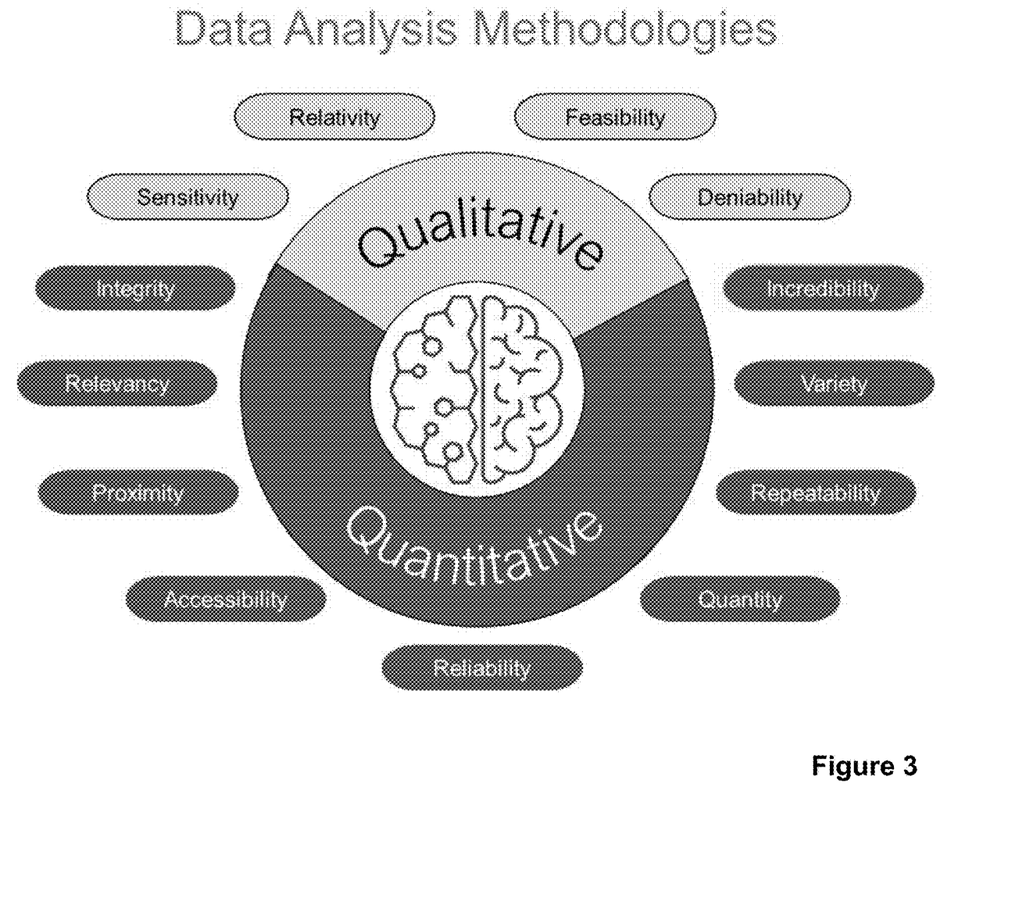
FIG. 3 is a schematic diagram depicting exemplary data analysis methodologies and criterion used to assess the APR.

Once received, the sensor information (e.g., data provided by the one or more sensors) can be compared with the received event information via the one or more servers 110, as well as information gleaned from social media platforms including text, audio, images, and video. Based on this comparison and the credibility and accuracy ratings of each input, the one or more servers 110 can assign a reliability rating to the input and event using artificial intelligence algorithms implemented by a processor. Exemplary data analysis methodologies and criterion used to assess the reliability rating are shown in FIG. 3.

Figure 5:
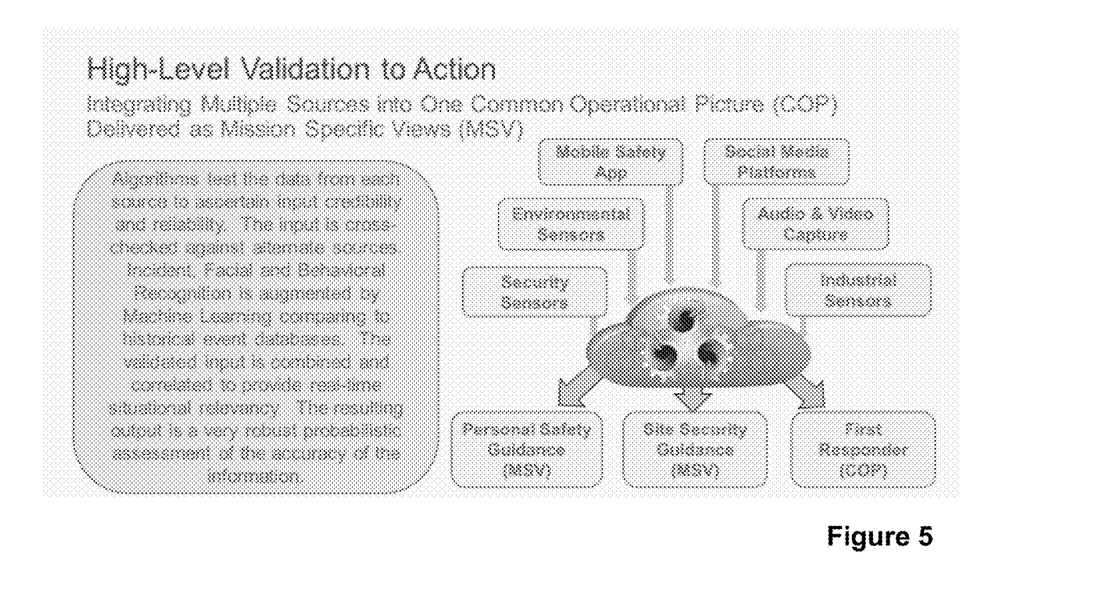
FIG. 5 is an exemplary flowchart showing the operation of the system.

Thus, the reliability rating can be based on credibility of the sources 122A-122N, accuracy of the information and probability of location, and multi-factor confirmation through comparison with disparate sources. The resulting reliability rating can be stored and used for machine learning to improve the system's analysis over time. An exemplary process using system 100 is shown in FIG. 5.

Preferably, the system 100 can generate an alert 142 if the reliability rating is greater than a predetermined threshold. The alert 142 can then be presented or transmitted to one or more recipients 140, with the specific recipients depending on the type of event, the location, and other factors. It is contemplated that the alert can include a geo-spatial and temporal representation of the event, such as that described in co-pending U.S. patent application having Ser. No. 16/330,699 filed on Mar. 5, 2019.

As new inputs are received, it is contemplated that the credibility can be adjusted as needed based on the new information received about the event including whether the new inputs are from more credible sources, the new inputs are more accurate in location, or provide information that is verifiable from other sources.

Figure 4:
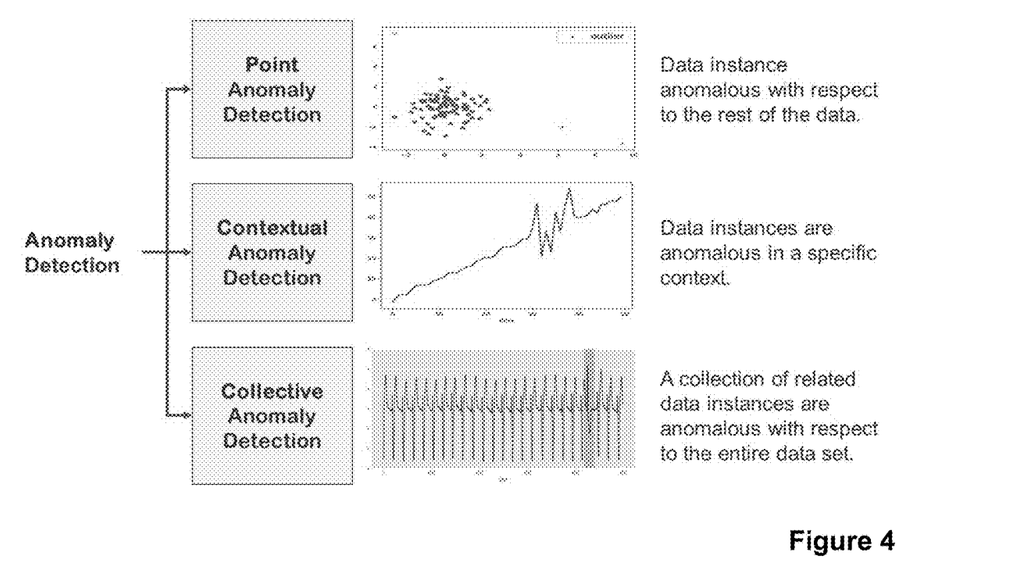
FIG. 4 is diagram showing an exemplary classification scheme for anomaly detection.

It is further contemplated that the one or more servers 110 can be configured to assign a quarantine status to a source or certain information if the credibility rating is below a predefined threshold. Additionally, the system 100 can utilize specific descriptors to capture and track sources of erroneous or hostile misinformation and identify subtle variations in reported information to differentiate accurate input from false positives, identify malicious corruption attempts, and detect subtle anomalies disqualifying the source. Exemplary schemes for uncovering and classifying anomalies is shown in FIG. 4. The system 100 preferably automatically quarantines misleading input and reports this deceptive input with all associated identifying markers. In this manner, future input from this source, or of the same context, is blocked, and if appropriate, authorities can be notified.

Figure 9:
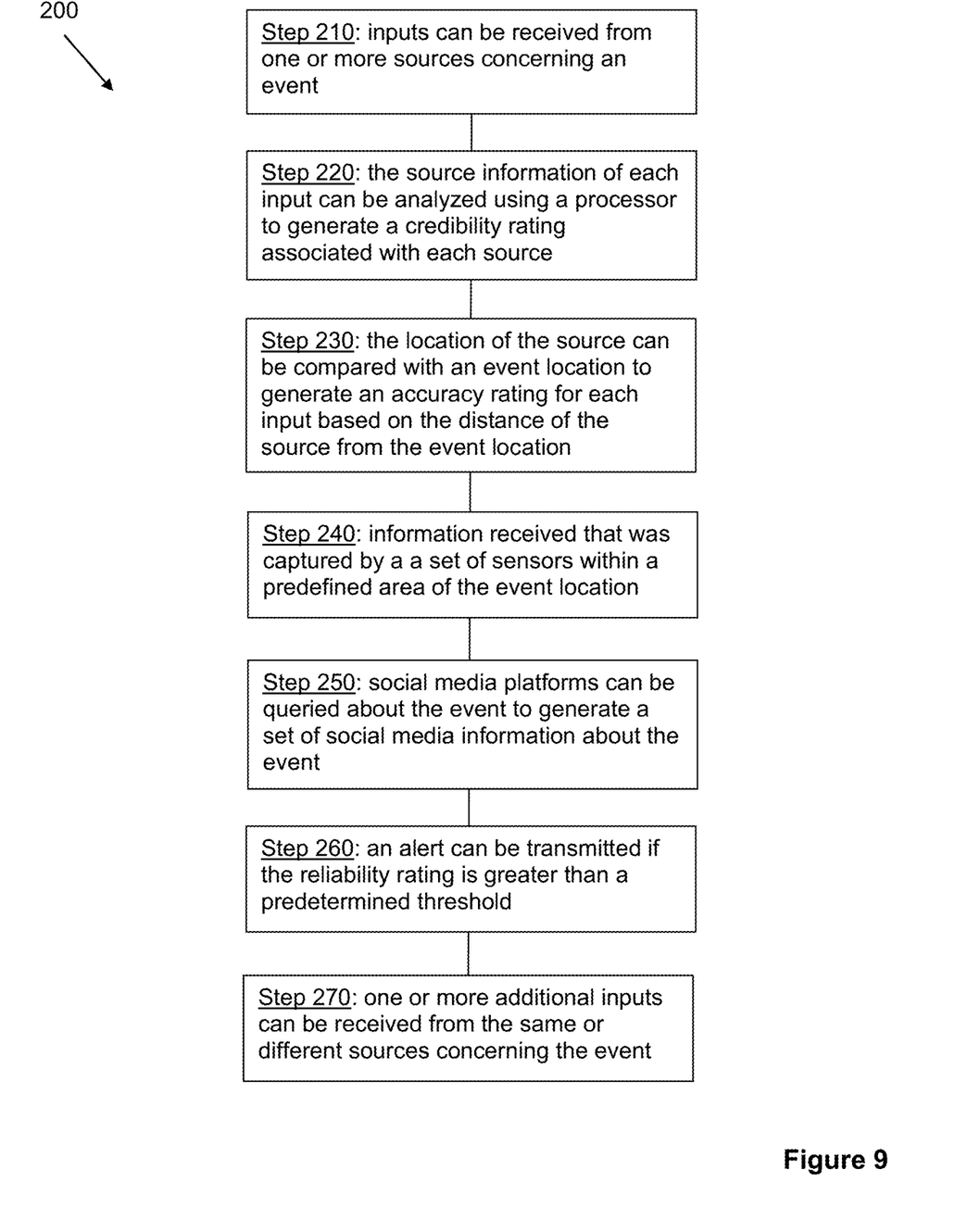
FIG. 9 is one embodiment of a method for determining an accuracy of crowd-sourced information.

FIG. 9 illustrates one embodiment of a method 200 for determining an accuracy of crowd-sourced information. In step 210, inputs can be received from one or more sources concerning an event. Preferably, each of the one or more inputs comprises source information and event information.

The source information comprises at least an identifier and a location of the source, which could be a user or device location for example. The identifier could be those described above such as a MAC address, an IP address, geocoordinates, and so forth. The event information can include, for example, an event location, a time the event occurred or the time the input was transmitted, and input identification markers.

Contemplated sources include, for example, a user submission, a sensor, a social media post, or other sources that can provide information about an environment, location, occurrence, or other aspect of an event.

In step 220, the source information of each input can be analyzed using a processor to generate a credibility rating associated with each source. In this step, it is contemplated that the source identifier can be compared with identifiers of known sources to determine whether the source was previously known. It is contemplated that the credibility rating can be based at least in part on whether the identifier is a known identifier and an accuracy of prior submissions from the source, if any.

In step 230, the location of the source can be compared with an event location to generate an accuracy rating for each input based on the distance of the source from the event location. Such comparison can review a location of the source from the source information to see whether the source was at or near the reported event location. It is contemplated that a higher accuracy rating can be assigned to inputs that are at the event location or within a predefined range of the event location.

In step 240, information can be received that was captured by a set of sensors within a predefined area of the event location. Once received, the information provided by the sensors can be compared with the received event information. A reliability rating can be assigned to the reported event based on the comparison and the credibility and accuracy ratings of each input.

In step 250, social media platforms can be queried about the event to generate a set of social media information about the event. That information can then be compared with the received data provided by the set of sensors and the received event information to cross-check the received information to determine its credibility and accuracy.

If the reliability rating is greater than a predetermined threshold, an alert can be presented or transmitted in step 260. It is contemplated that the predetermined threshold may vary depending on the type of event and the location. For example, a reported active shooter may have an alert transmitted at a lower predetermined threshold for the reliability rating because of the potential for imminent harm.

In some embodiments, the alert comprises a geo-spatial and temporal representation of the event.

Where a source is unknown or the assigned credibility rating is below a predetermined threshold, for example, a quarantine status can be assigned to an information source.

After the reliability rating is assigned, in step 270, one or more additional inputs can be received from the same or different sources concerning the event. Source information of the additional sources can be analyzed, and a credibility rating can be assigned to each as discussed above. When a source already has an assigned credibility rating, it is contemplated that the rating may be adjusted based on new information or changes in algorithms or assumptions.

A location of the additional source can be compared with the event location such as described above, and an accuracy rating can be assigned to the additional input based on the distance of the additional source from the event location. The information from the additional inputs can be compared with other information retrieved about the event, such as that provided by sensors (e.g., camera and so forth), social media platforms, and other sources. Based on this comparison and the assigned credibility and accuracy ratings, the reliability rating of the event may be adjusted up or down.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed considering the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A system for determining an accuracy of crowd-sourced information, comprising:
    a server configured to receive transmissions of input data from a plurality of sources concerning an event, wherein the input data from each of the plurality of sources comprises an identifier and a location of the source;
    wherein the server is configured to automatically (i) analyze the identifier of each source, and (ii) assign a credibility rating to each of the sources based on whether the identifier of that source was previously stored on the server and accuracy ratings associated with prior submissions from that source;
    wherein the server is further configured to compare the location of the source with an event location and assign an accuracy rating to each source based on the distance of the source from the event location;
    wherein the server is further configured to receive digital data captured by at least one sensor within a predefined area of the event location;
    wherein the server is further configured to assign a reliability value to the event based on (i) the credibility and/or accuracy ratings of each source and (ii) multi-factor confirmation through a comparison of the received event information from the plurality of sources when compared with the received data captured by at least one sensor; and
    wherein the server is further configured to autonomously decide to present or transmit an alert related to the event when the reliability value is greater than a predetermined threshold, wherein the alert comprises validated data concerning the event that is combined and correlated to provide real-time situational relevancy.

2. The system of claim 1, wherein at least one of the sources comprises a social media post or a user submission.

3. The system of claim 1, wherein the server is configured to compare the identifier of each source with known identifiers stored on the server and assign the credibility rating to each of the sources based at least in part on whether the identifier was previously stored on the server.

4. The system of claim 3, wherein each of the known identifiers is associated with a set of prior submissions to the server, and wherein the credibility rating assigned to each of the sources is based at least in part on an accuracy of the prior submissions.

5. The system of claim 1, wherein the event information comprises the event location, a time the event occurred, and input identification markers.

6. The system of claim 1, wherein the identifier comprises a device ID or a user ID.

7. The system of claim 1, wherein the server is configured to assign a quarantine status to a source if the credibility rating is below a predefined threshold.

8. The system of claim 1, wherein the server is further configured to query one or more social media platforms concerning the event and wherein at least one of the sources comprises a social media platform.

9. The system of claim 8, wherein the event information from one or more social media platforms comprises at least one of pictures, audio, or video of the event.

10. The system of claim 1, wherein the predetermined threshold is based on a type of event.

11. The system of claim 10, wherein the server is further configured to generate a geo-spatial and temporal representation of the event.

12. The system of claim 1, wherein the server is configured to:
    receive additional input from an additional source concerning the event,
    analyze source information of the additional source and assign a credibility rating to the additional source,
    compare a location of the additional source with the event location and assign an accuracy rating to the additional input data based on the distance of the additional source from the event location, and
    adjust the reliability value associated with the event based on the credibility of the additional source, the accuracy rating of the additional input data and a comparison of the received sensor data from the set of sensors with the received event information from the additional source.

13. The system of claim 1, wherein the input data from each of the plurality of sources further comprises information concerning a role and experience of the source, and wherein the assigned credibility rating of a source is based at least in part on the role and experience of the source.

14. The system of claim 1, wherein the input data from each of the plurality of sources further comprises at least one of audio, image, or video content.

15. A method for determining a reliability of crowd-sourced information, comprising:
    receiving input data from one or more sources concerning an event, wherein the input data from each of the one or more sources comprises an identifier and a location of the source;
    wherein the one or more sources comprises at least one of a social media post and a user submission, and wherein the event information comprises a location of the event, a time the event occurred, and input credibility identification markers;

automatically (i) analyzing the input data of each source, and (ii) using a processor to generate a credibility rating assigned to each source based on whether the identifier of the source was previously stored on the server and accuracy ratings associated with prior submissions from that source;

comparing the location of the source with an event location to generate an accuracy rating for each source based on the distance of the source from the event location;

receiving information captured by one or more digital sensors near the location of the event;

comparing the received information captured by the one or more digital sensors with the received input data from the one or more sources;

assigning a reliability value to the event based on (i) the credibility and/or accuracy ratings of each source and (ii) multi-factor confirmation through a comparison of the received input data from the one or more sources when compared with the received information captured by the one or more sensors; and autonomously deciding to transmit an alert when the reliability value is greater than a predetermined threshold, wherein the alert comprises validated data concerning the event that is combined and correlated to provide real-time situational relevancy.

16. The method of claim 15, wherein the alert comprises a geo-spatial and temporal representation of the event.

17. The method of claim 15, further comprising:
querying social media platforms concerning the event to generate a set of social media information about the event; and
comparing the received set of social media information with the received information captured by the one or more sensors and the received input data from the one or more sources.

18. The method of claim 15, further comprising assigning a quarantine status to a source if the credibility rating is below a predefined threshold.

19. The method of claim 15, further comprising:
receiving additional input data from an additional source concerning the event;
analyzing input information of the additional source and assigning a credibility rating to the additional source;
comparing a location of the additional source with the event location and assigning an accuracy rating to the additional input data based on the distance of the additional source from the event location; and
adjusting the reliability value associated with the event based on the credibility of the additional source, the accuracy rating of the additional input data and a comparison of the received information captured by the one or more sensors with the received event information from the additional source.

* * * * *